W. E. GIBBS.
CROSSCUT SAW GAGE.
APPLICATION FILED NOV. 23, 1917.
1,373,719.
Patented Apr. 5, 1921.
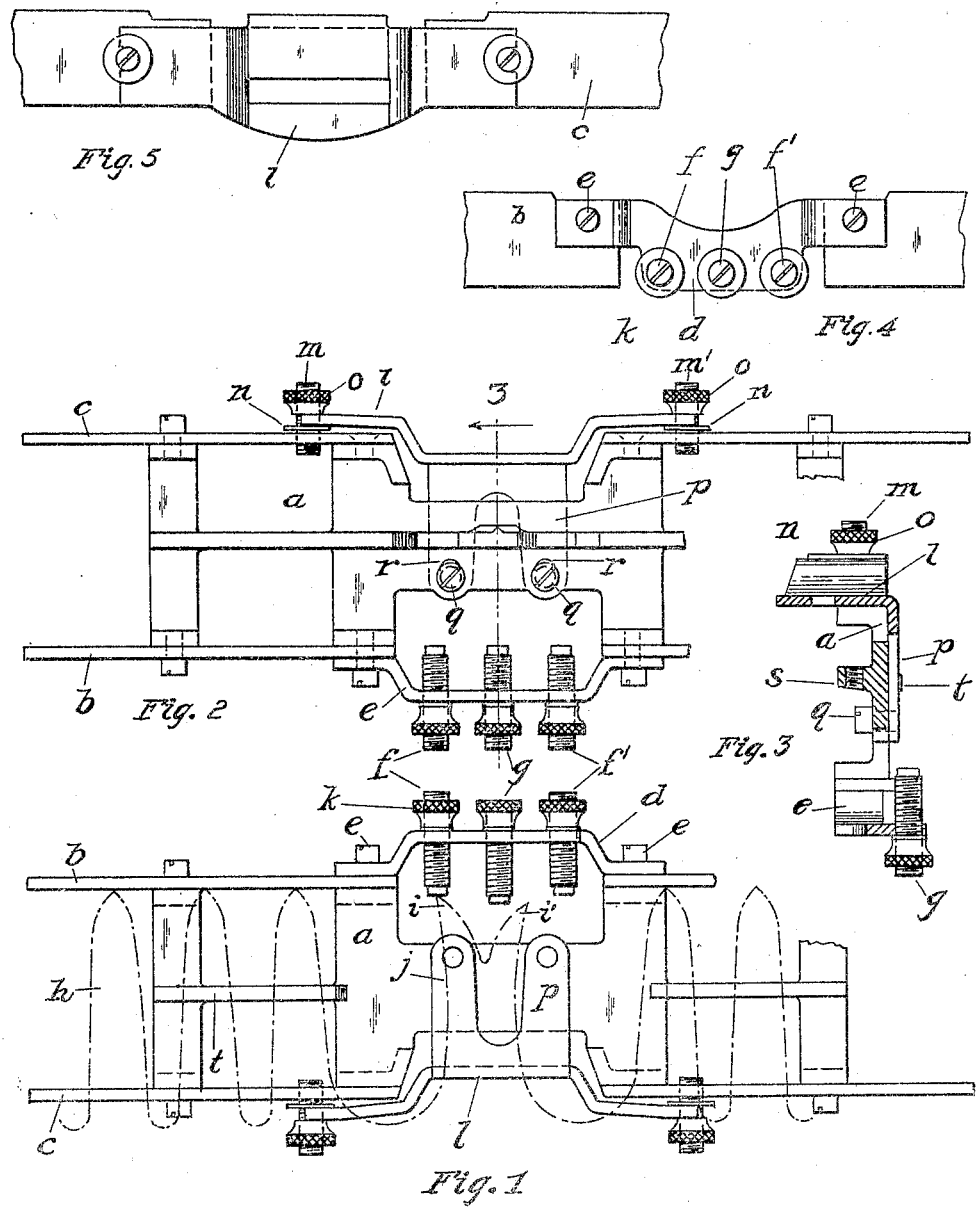
Inventor:
William E. Gibbs
by
Attorney

UNITED STATES PATENT OFFICE.

WILLIAM E. GIBBS, OF PORTLAND, OREGON.

CROSSCUT-SAW GAGE.

1,373,719.	Specification of Letters Patent.	Patented Apr. 5, 1921.

Application filed November 23, 1917. Serial No. 203,640.

*To all whom it may concern:*

Be it known that I, WILLIAM E. GIBBS, a citizen of the United States, and a resident of the city of Portland, county of Multnomah, State of Oregon, have invented a certain new and useful Improvement in Crosscut-Saw Gages, of which the following is a specification.

The object of my invention is to perfect the gage of the character referred to in the following particulars: The adjustable gage-plate by which is gaged the height of the raker teeth in the act of dressing them down, after having been swaged, must be rigidly held in place, otherwise the accuracy of the tool is not assured. But the means for securing the gage plate in place after its adjustment should be independent of its adjusting means; for if both functions be performed by the same element the adjustment is apt to be disturbed by the further manipulation of the adjusting means, in the act of rigidly clamping the gage plate in place.

In my improved gage the means for adjusting the gage plate serve only that purpose, and when the gage plate has been adjusted, it is rigidly secured in place by other and independent means; and hence the adjustment of the gage plate is not disturbed in the slightest. Furthermore, in the falling type of cross-cut saws the rakers are commonly so gaged from the middle toward the ends as to give that member or point of the rakers located nearest the ends, respectively, a lead over the other. In practice it is found desirable to have a gage adapted for gaging both ends of the saw, as mentioned, without having to reverse the saw. My gage is so constructed that the operator may work therewith from the middle of the saw toward both ends, and complete the work without reversing the saw.

The construction and use of my gage is illustrated in the accompanying drawings, in which:

Figure 1 is a partial side elevation of my saw gage as arranged when used on the rakers;

Fig. 2 shows a partial side elevation of my gage as arranged when using the same for finishing the members of the rakers; this view illustrating the improved features of my gage with respect to its gage-plate, the means for effecting its adjustment with respect to the body-piece of the gage, and the independent means provided for rigidly securing the gage-plate in place after its adjustment on the body-piece;

Fig. 3 is a transverse section on the line 3—3 of Fig. 2;

Fig. 4 shows a partial top view of my gage when arranged as shown in Fig. 1; and Fig. 5 shows a partial top view of my gage when arranged as shown in Fig. 2.

The body-piece, $a$, is of the usual construction, except that the parts $b$, $c$ are removable so that they may be trued and hardened.

Having reference now to my gage as arranged when to be used as illustrated in Fig. 1: $d$ is a plate rigidly secured on the body-piece, $a$, by screws $e$, $e$. The plate $d$ is curved at its ends so as to raise the main middle part thereof clear of the work and facilitate the observation of the latter. In the plate $d$ is threaded a set of three gage pins $f$, $g$, $f'$, for determining the relative length of the members $i$, $i'$ of the rakers $j$, or the latter to each other. The saw is represented in Fig. 1 by dot-and-dash outline $h$. The set of three gage pins $f$, $g$, $f'$ facilitates the gaging operations mentioned. That is to say, the gage pins $f$, $g$ serve to gage the relative lengths of the longer and the shorter members $i$, $i'$ of the rakers $j$ of one end of the saw; and the gage pins $g$, $f'$ perform the same office for the rakers on the other end of the saw. The set of three pins $f$, $g$, $f'$ also, as obvious, provides for the convenient, relative gaging of the rakers, and their points, as will be self suggesting to every practical filer or operator. And this gaging work may be done without turning the saw, which is a great convenience and advantage.

$k$ are lock nuts.

Referring now to the arrangement of my gage as illustrated in Fig. 2: $l$ is a gage-plate which is connected with the body-piece, $a$, by means of the screw-posts $m$, $m'$, threaded into the piece $c$ of the body piece. The screw posts $m$, $m'$ have each a collar $n$ made integral with or fixed on the screw posts, which serve as a shoulder or support for the ends of the gage-plate $l$. $o$ are clamping nuts serving to clamp and hold the extremities of the gage plate $l$ on the collars $n$. The devices $m$, $m'$, $n$, $o$ are to be employed in the first instance exclusively for adjusting the gage plate $l$, and not for rigidly holding the same in place as adjusted. The latter result is, in the first instance, provided for by making the gage plate *l* with a pendent web *p*, which for lightness is made bifurcated, but otherwise such detail of construction is immaterial. The body-piece, *a*, is provided with slots *r* (see Fig. 2) through which extend set-screws *q*, threaded into the web *p*; and therefore by tightening the set-screws *q* said web of the gage plate *l* is rigidly clamped to the web of the body-piece, and the gage plate *l* is rigidly held in its adjusted position; and, as obvious, the act of rigidly clamping the gage plate *l* in its adjusted position is unaccompanied by any danger of disturbing its previous adjustment by the screws *m*, *m'* and coöperating devices.

In the use of my device, first the set-screws *q* are released, then the clamping nuts *o* are released, then the screw posts *m* are adjusted so as to bring the gage plate *l* in its proper adjustment, then the clamping nuts *o* are loosely set upon the extremities of the gage plate *l*, then the set screws *q* are tightened, and finally the clamping nuts *o* are tightened; in this way holding the gage plate rigidly at the four points.

*s* is the lug or rib in which the screw provided for clamping a file in place is threaded. *t* is the longitudinal rib common to this tool; and other parts not described are made and function as usual.

I claim:

1. In a saw gage of the character described, the combination of a body piece, a gage plate, a pair of screw posts threaded into the body piece, each provided with a collar-like shoulder, the extremities of the gage plate bearing on said shoulders, clamping nuts threaded on the screw posts, and supplemental means for clamping the gage plate in position as adjusted.

2. In a saw gage of the character described, the combination of a body piece, a gage plate, a pair of screw posts threaded into the body piece, each provided with a collar-like shoulder, the extremities of the gage plate bearing on said shoulders, clamping nuts threaded on the screw posts, said gage plate having a pendant web, and means for clamping said web to the body piece, thereby holding the gage plate rigid in the position to which adjusted.

3. In the saw-gage of the character described, the combination of an elongated body-piece, an elongated gage-plate, means carried by each end of the latter for adjusting and fixing the gage-plate relatively to the top of the body-piece, and supplemental means for clamping the gage plate after adjustment.

4. In an elongate saw-gage of the character described, three adjustable gage pins located side by side, one thereof being located in the middle of the gage, and one of the other pins being located on either side of said middle pin, whereby the relative length of one tooth with respect to another may be gaged by the longitudinal movement of the gage over the teeth of the saw.

WILLIAM E. GIBBS.